United States Patent
Toda et al.

(10) Patent No.: US 6,851,036 B1
(45) Date of Patent: Feb. 1, 2005

(54) METHOD AND APPARATUS FOR CONTROLLING EXTERNAL DEVICES THROUGH ADDRESS TRANSLATION BUFFER

(75) Inventors: Makoto Toda, Hachioji (JP); Junichi Nishimoto, Hachioji (JP); Masayuki Ito, Higashimurayama (JP); Yutaka Yoshida, Kodaira (JP); Jun Hasegawa, Sunnyvale, CA (US)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/530,787

(22) PCT Filed: Nov. 6, 1998

(86) PCT No.: PCT/JP98/05002

§ 371 (c)(1),
(2), (4) Date: Jul. 19, 2000

(87) PCT Pub. No.: WO99/24906

PCT Pub. Date: May 20, 1999

(30) Foreign Application Priority Data

Nov. 6, 1997 (JP) .............................................. 9-303911

(51) Int. Cl.⁷ ............................................. G06F 12/00
(52) U.S. Cl. ........................ 711/202; 711/206; 711/205
(58) Field of Search ................................. 711/206, 202, 711/200, 203, 205, 207

(56) References Cited

U.S. PATENT DOCUMENTS

| | | | | | |
|---|---|---|---|---|---|
| 5,440,708 | A | * | 8/1995 | Takagi ......................... | 711/208 |
| 5,905,885 | A | * | 5/1999 | Richter et al. .............. | 395/500 |
| 5,960,463 | A | * | 9/1999 | Sharma et al. .............. | 711/206 |
| 6,044,215 | A | * | 3/2000 | Charles et al. ................ | 703/25 |
| 6,349,362 | B2 | * | 2/2002 | Luick .......................... | 711/128 |

FOREIGN PATENT DOCUMENTS

| | | |
|---|---|---|
| JP | 61-253559 | 11/1986 |
| JP | 63-296158 | 12/1988 |
| JP | 4-205159 | 7/1992 |
| JP | 5-067000 | 3/1993 |
| JP | 8-095943 | 4/1996 |

* cited by examiner

*Primary Examiner*—Kimberly N. McLean-Mayo
(74) *Attorney, Agent, or Firm*—Mattingly, Stanger & Malur, P.C.

(57) ABSTRACT

A data processing system and a data processor in which the control information for controlling an external device, especially, a device having a PCMCIA interface is stored in an address translation circuit for translating a first address outputted from a CPU to a second address in association with the first or second address.

4 Claims, 7 Drawing Sheets

METHOD AND APPARATUS FOR CONTROLLING EXTERNAL DEVICES THROUGH ADDRESS TRANSLATION BUFFER

FIELD OF THE INVENTION

The present invention relates to a data processor such as a microprocessor or a microcomputer, and more particularly, relates to a data processor for efficiently controlling an external device to be connected.

BACKGROUND OF THE INVENTION

Although the performance of a data processor such as a microprocessor is tried to be improved by improving the frequency, since improvement in the frequency of a system bus for connecting the data processor is behind in practice, the performance is not so improved as expected under the present circumstances. Since the kinds of external devices connected to the system bus have been becoming various, the control of the external devices becomes complicated. This is one of the reasons that the performance is not so improved.

One of external device interfaces connected to the system bus is a PCMCIA interface which has been noted recently. The PCMCIA is an interface specification of an IC memory card or the like standardized by the PCMCIA (PC Memory Card International Association) as a standardization organization of an IC memory card and is also applied for an input/output specification of a modem, a LAN, and the like.

Since the setting of a wait and a bus width can be dynamically changed for a small area in the PCMCIA interface, a structure optimum for the system can be easily achieved. Under the present circumstances, however, a conventional data processor cannot sufficiently cope with the function for being able to dynamically switch the setting of the wait and the bus width of the PCMCIA interface.

On the other hand, a conventional high-performance microprocessor employs a technique of translating a virtual address used for accessing an external device into an external memory address by using a translation look-aside buffer (hereinafter, TLB). The TLB not only generates the external memory address by using the address translation information but also determines the access right and selects a cache access mode of a built-in cache memory. The access right is to specify an access permitted to each of loading and storing in accordance with an internal mode determined by a mode register built in the data processor. When there occurs an access violating the access right, an exception occurs in the data processor. The cache access modes include a write-through access and a copy back access. The access mode is switched for each TLB used for performing an address translation. The TLB in the conventional data processor performs the address translation in such a manner and executes a control in the data processor at the time of the address translation. Conventionally, there is not even awareness of employing a TLB in which the control of the external device connected with the data processor is taken into account.

As described above, in the conventional data processor, also in the case of connecting an external device having an interface such as a PCMCIA interface via a system bus with the data processor, the bus width and the wait in an access to the PCMCIA interface can be handled only fixedly. Accordingly, there is a problem that the data processor cannot sufficiently cope with the function useful for being able to dynamically switch the setting of the wait and the bus width of the PCMCIA interface. Even if the control information such as the bus width and the wait in an access to the PCMCIA interface is kept in a control register or the like in the data processor, when the necessity of changing the setting of the bus width, the wait and the like arises, the setting of the control register or the like has to be changed each time. When some settings are desired to be simultaneously used, the performance is not improved.

An object of the invention is to provide a data processor and a data processing system which allows an external device having an interface such as a PCMCIA interface capable of dynamically changing an access method to easily use the changing function during an actual operation.

The above object, including novel features of the invention will become apparent from the following description and the attached drawings.

SUMMARY OF THE INVENTION (Means)

In order to achieve the object, according to the invention, an external device control information which designates a method of accessing an external device having an interface such as a PCMCIA interface and the like is stored in a TLB provided in a data processor for an address translation information. When a logical address used for accessing the external device is translated by using the TLB, the control information is allowed to be read from the TLB. The control information is read from the TLB simultaneously with translation of a virtual address. When the virtual address is not translated by using the TLB, there is provided a built-in circuit which uses a predetermined value kept in a built-in register or the like for controlling an external device.

(Effect)

According to the invention, by recording a method of accessing an external device having an interface such as the PCMCIA interface as a part of an address translation information of the TLB, when performing an address translation via the TLB, an information for designating the method for accessing an external device can be used for the unit of a page in which a virtual address is translated into a physical address. Where the address translation is not performed from the virtual address by using the address translation information of the TLB, a method for accessing an external device can be designated by using a predetermined value of the built-in register.

BRIEF DESCRIPTION OF THE DRAWINGS

FIG. 7 shows a configuration diagram in case that an IC memory card is connected with the PCMCIA interface as in FIG. 1 for the embodiment of the invention. As used in the above mentioned figures, there is provided a data processor 100, a CPU 101, an instruction TLB 102, an instruction cache memory 103, a data TLB 104, a data cache memory 105, an external bus controller 106, a ROM 107, a SRAM 108, a PCMCIA interface 109, and a SDRAM 110. There is still provided a selector for information of instruction TLB or information of data TLB 137, an instruction TLB 200, a comparator in instruction TLB 201, an address generator in instruction TLB 202, a virtual address/physical address selector in instruction TLB 203, an address decoder in instruction TLB 204, a selector for information to control PCMCIA in instruction TLB 205, a register for storing information to control PCMCIA in instruction TLB 206, DATA TLB 300, a comparator in data TLB 301, an address generator in data TLB 302, a virtual address/physical address selector in data TLB 303, an address decoder in data TLB 304, a selector for information to control PCMCIA in data TLB 305, and a register for storing information to control PCMCIA in data TLB 306. There is still provided a register for storing information to control timing 400, a bus width/memory attribute decider 401, a register for storing information to control timing 500, and a register for storing information to control timing 501.

DETAILED DESCRIPTION OF PREFERRED EMBODIMENT

Figure 1:
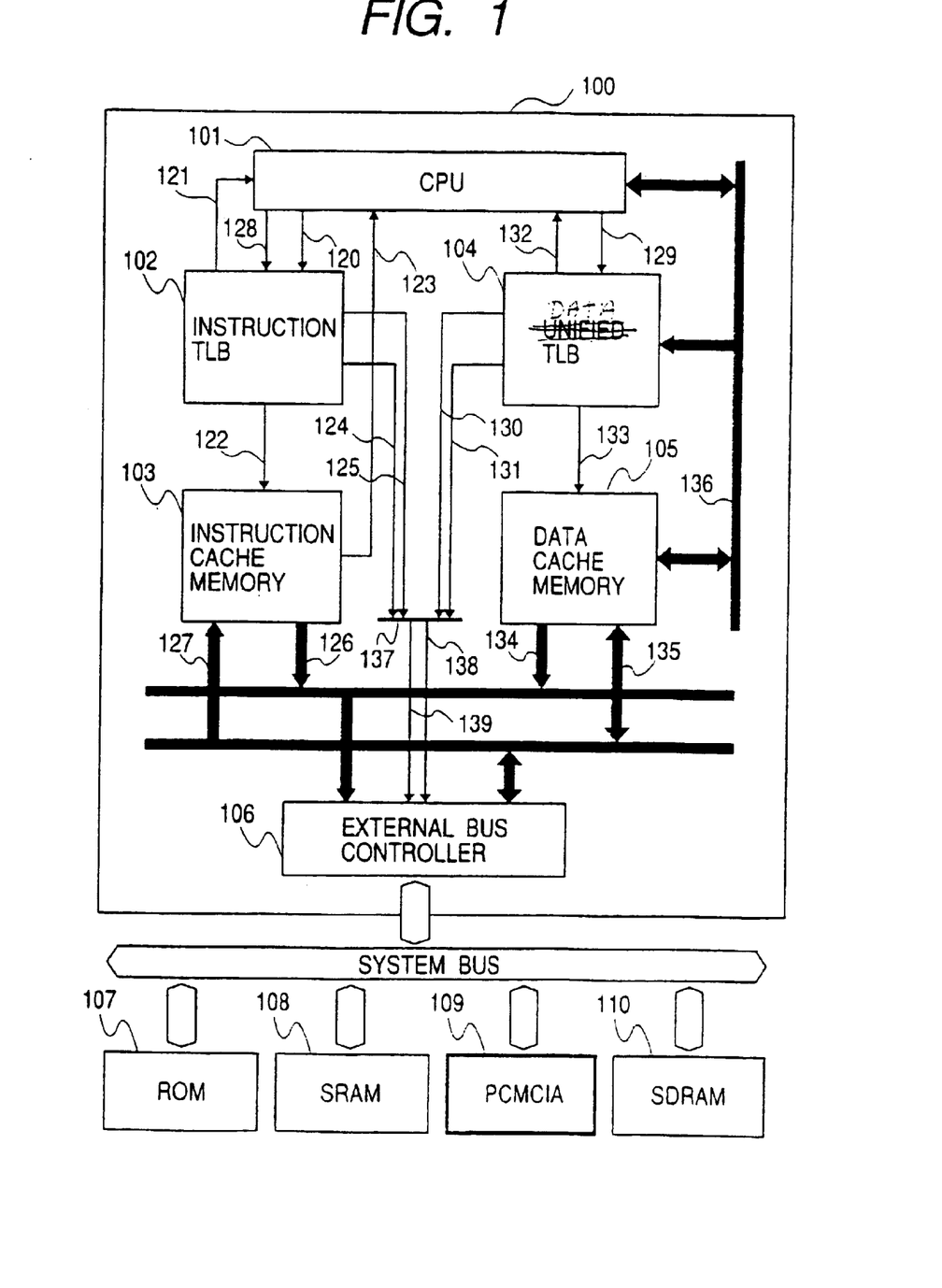
FIG. 1 shows a configuration diagram of a data processor in which a data processor and external devices are connected with each other for an embodiment of the invention.

FIG. 1 shows a configuration diagram of a data processing system in which a data processor for an embodiment of the invention is connected with external devices via a system bus.

A data processor 100 includes mainly a CPU 101, an instruction TLB 102, an instruction cache memory 103, a data TLB 104, a data cache memory 105, and an external bus controller 106. The data processor 100 is connected with a ROM 107, a SRAM 108, a PCMCIA interface 109, and a SDRAM 110, respectively as external devices through a system bus.

External devices connected with the data processor 100 are not limited to the above devices. FIG. 1 shows mainly functions related to the invention.

The instruction cache memory 103 and the instruction TLB 102 receive an instruction fetch request from the CPU 101. The instruction TLB 102 which has received the instruction fetch request receives an instruction fetch address outputted from the CPU 101 to a signal line 120, performs an address translation, and transmits the translated address to the instruction cache memory 103 via a signal line 122. Simultaneously, a control information to the PCMCIA interface 109 is outputted through signal lines 124 and 125, selected by a selector 137, and sent to the external bus controller 106 via signal lines 138 and 139.

Although a signal line 124 represents a timing control signal for accessing the PCMCIA interface and a signal line 125 represents a memory attribute information for accessing the PCMCIA interface, as long as the above signal lines 124 and 125 represent the control information for accessing the PCMCIA interface or an information which designates a method of accessing other external devices, the representations of both signal lines are not limited to the above information.

When the instruction TLB 102 fails the address translation, an exception signal is sent to the CPU 101 via a signal line 121.

The instruction cache memory 103 receives the address translated by the instruction TLB 102 via the signal line 122, an instruction code is read from the cache memory by using the address, and the instruction code is returned to the CPU 101 via a signal line 123.

When there is no instruction in the cache memory, it is necessary to read an instruction from an external device. In this case, the address translated by the instruction TLB 102 is sent via a signal line 126 to the external bus controller 106.

When the address requires an access to the PCMCIA interface 109, the external bus controller 106 which has received the address determines a method of accessing the PCMCIA interface, 109 by using control information of the PCMCIA interface sent via the signal lines 138 and 139, accesses the PCMCIA interface, and returns the instruction to the cache memory. In the case of accessing any of a ROM 107, a SRAM 108 and a SDRAM 110 shown in the diagram as external memories, an instruction is read from the external memory through the system bus and is returned to the cache memory via a signal line 127.

The CPU 101 which has received the instruction code decodes the code and executes the instruction.

When the instruction is to perform a read/write access from/to the external device, in the case of the read access, the CPU 101 transmits a virtual address for accessing the external device to the data TLB 104 via a signal line 129. The data TLB 104 which has received the virtual address translates the address and sends the translated physical address to the data cache memory 105 via a signal line 133. Simultaneously, the control information of the PCMCIA interface 109 is selected by the selector 137 through the signal lines 130 and 131 and is sent to the external bus controller through the signal lines 138 and 139. When the address translation fails in a manner similar to the instruction TLB 102, an exception signal is sent to the CPU 101 via a signal line 132. Data is read from the data cache memory 105 by using the physical address translated by the data TLB 104 and is returned to the CPU 101. When there is no data in the cache memory, it is necessary to read data from an external device. In this case, the address translated by the data TLB 104 is sent through the signal line 133 to the external bus controller 106 via the address bus.

When the address requires an access to the PCMCIA interface, the external bus controller 106 which has received the address determines the method of accessing the PCMCIA interface 109 by using the control information of the PCMCIA interface obtained through the signal lines 138 and 139, accesses the PCMCIA interface, returns the data to the cache memory, and returns the data to the CPU 101 via a data line 136. In case of accessing any of the other external memories, such as the ROM 107, SRAM 108 and SDRAM 110, data is read from the external memory via the system bus, sent via a signal line 135, and returned to the cache memory.

The embodiment has been described with respect to the read access to the external device. In the case of a write access, the series of operations from the execution of the instruction by the CPU 101 to the access to the external device are the same and data is written into an external device.

According to a cache access mode, there is a case such that data is written only on a cache memory but is not written onto an external device.

In a high-performance microprocessor, when a virtual address for accessing an external device is translated to an external memory address by using the instruction TLB 102 or the data TLB 104, the virtual address before translation has 32 bits or 64 bits long. A virtual address is translated so that a translated external memory address is within an external address space supported by the data processor. The address space is generally 28 to 32 bits long. The invention is not particularly limited to this length. The range of the space of the virtual address to be translated by the TLB varies such as 1 Kbyte, 4 Kbytes, 64 Kbytes, or 1 Mbyte, dependent on a data processor. The address can be translated so as to be within each of the areas. A plurality of the translation information are registered in the TLB. The data processor automatically performs the address translation by using the corresponding address translation information. The number of the address translation information which can be recorded in the TLB varies dependent on a data processor. It generally lies in a range from 64 to 256. When the corresponding address translation information does not exist in the TLB, the data processor generally generates an exception signal. Software records again the address translation information in the TLB in an exception processing routine. In some cases, the process is automatically performed by the data processor.

Figure 2:
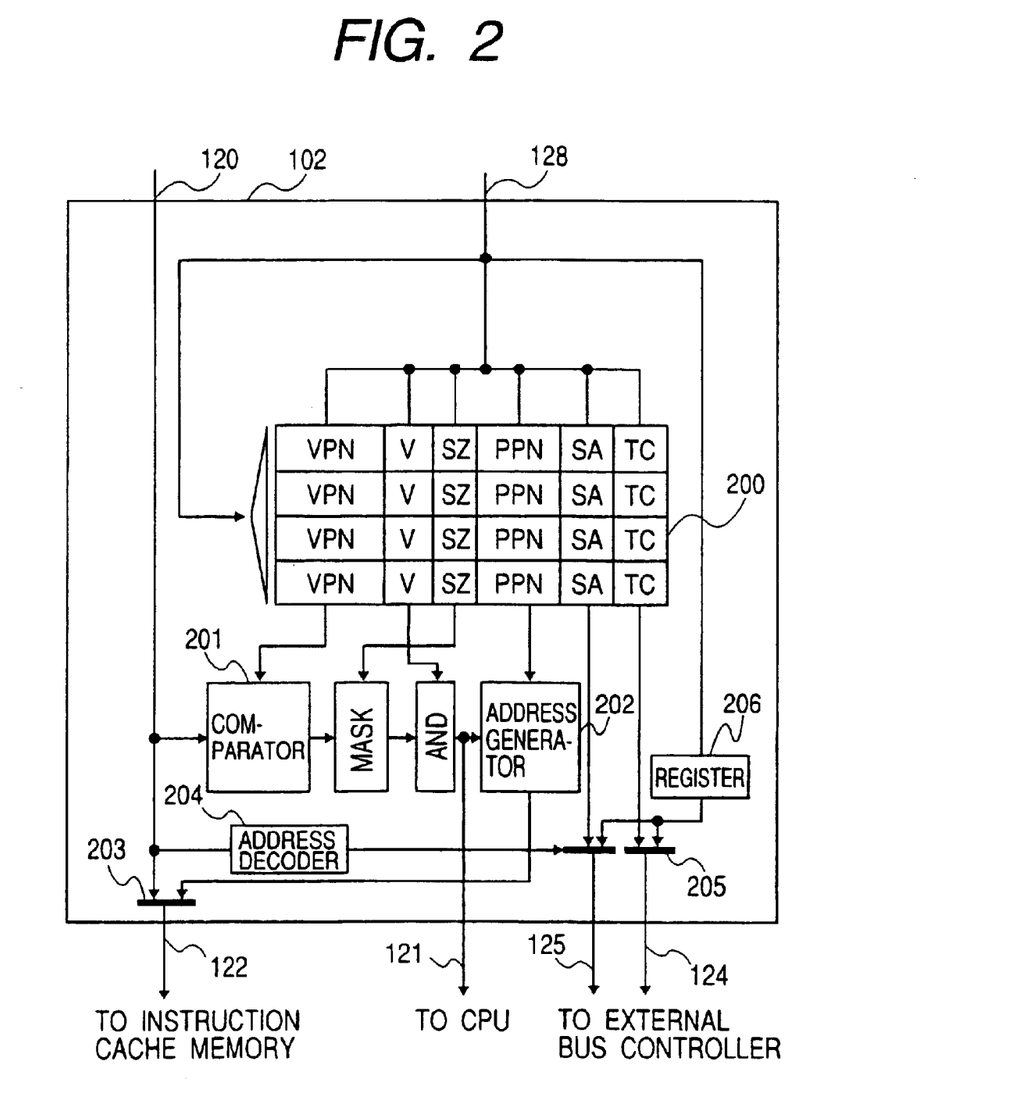
FIG. 2 shows an example diagram of the configuration of an instruction TLB provided in the data processor for the embodiment of the invention.

FIG. 2 shows an example diagram indicating a basic configuration of the instruction TLB 102 as in FIG. 1.

This embodiment will be described by using the instruction TLB 102 comprising four TLBS, each having address translation information, such as VPN, V, SZ, SA, and TC.

The instruction TLB 102 has an information for address translation in each of four TLBs 200 for translating an instruction fetch address sent through the signal line 120. Write of data to the TLB 200 is by inputting from the signal line 120 a signal in which a write position is designated from the CPU and inputting the write data through a signal line 128.

The information VPN written to the TLB 200 indicates the address in the virtual address space which is set in a range wider than that of the external memory space, V denotes whether the translation information is valid or invalid, SZ denotes a range (1 Kbyte, 4 Kbytes, 64 Kbytes or 1 Mbyte) of the virtual address space of the VPN, PPN indicates an address in the external memory space to be translated, SA indicates a memory attribute information of the PCMCIA interface, and TC indicates a timing control information of the PCMCIA interface. For SA and TC, a value to be changed for different PPN can be set. Data is written to a built-in register 206 used in the case of not using the TLB when setup data of the PCMCIA interface is inputted and written from the CPU 101 to the signal line 128.

When the instruction fetch request is received from the CPU 101, it is compared with the four address translation information VPN corresponding to the instruction fetch address sent through the signal line 120 by a comparator 201 all at once. The range of the space of the address to be translated is mask processed and determination is carried out by the valid/invalid information V of the translation information. When it is found by the determination result that the address translation fails, an exception signal is sent to the CPU. When it succeeds, the address translation information PPN to be translated is read and a physical address is generated by an address generator 202. When a cache memory is used, the generated physical address is selected by a selector 203. When a cache memory is not used, the address sent through the signal line 120 is selected by the selector 203.

Simultaneously, the timing control signal TC of the PCMCIA interface and the memory attribute selection signal SA are read. At this time, the data sent through the signal line 120 is decoded by using an address decoder 204. In accordance with the decoded signal, whether the TLB is used or not is selected by a selector 205. When the TLB 200 is not used, a value of a built-in register 206 in which the PCMCAIA control information is set is outputted to the external bus controller. When the TLB 200 is used, TC and SA in the TLB are outputted to the external bus controller.

According to the embodiment, by recording the information of accessing the PCMCIA interface in the TLB, when the address translation is performed, information of designation of an access to the PCMCIA interface can be used for a unit of page of a translated address. Even when the address translation is not carried out, by using a predetermined value in the built-in register, the access to the PCMCIA interface can be designated.

Figure 3:
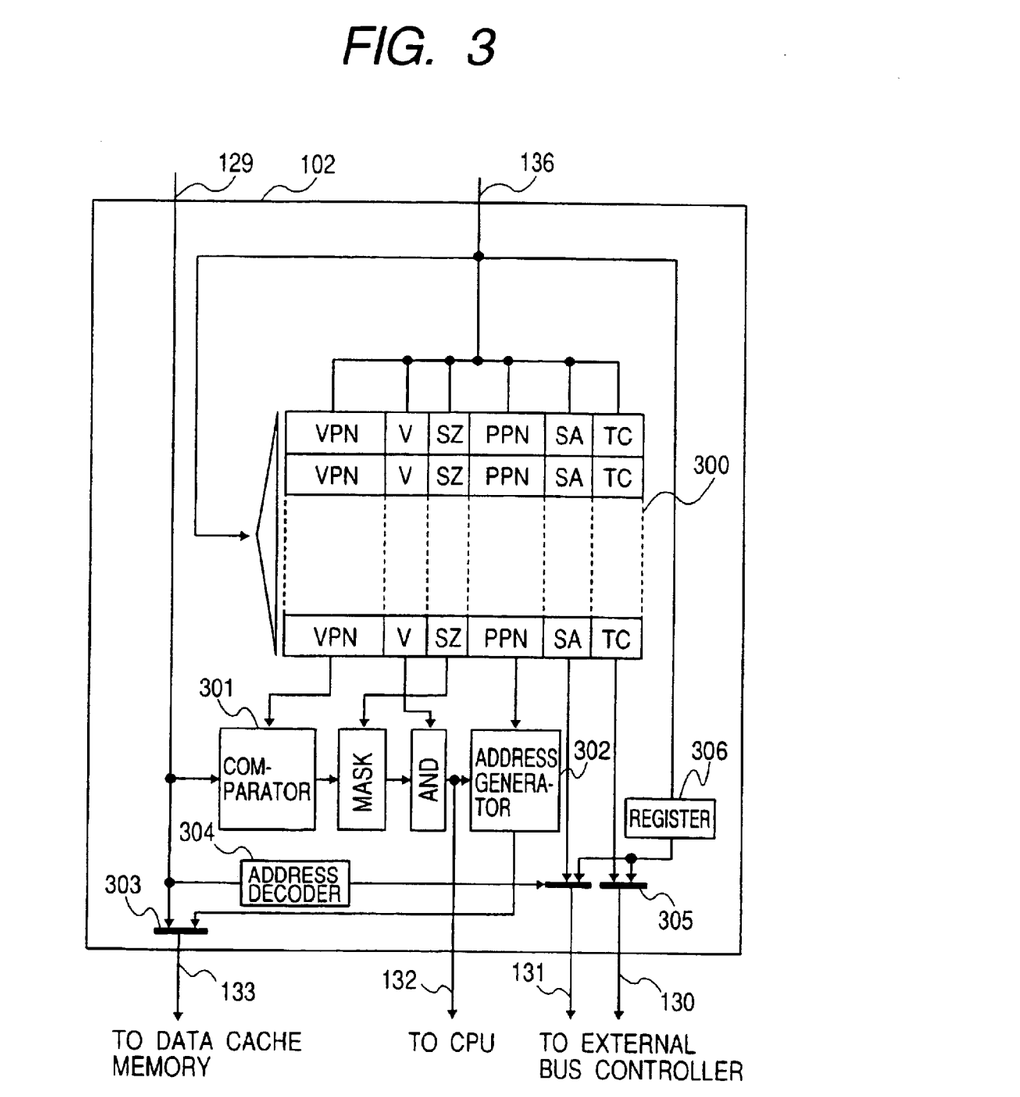
FIG. 3 shows an example diagram of the configuration of a data TLB provided in the data processor for the embodiment of the invention.

FIG. 3 shows an example diagram of a basic configuration of the data TLB 104.

The embodiment will be described by using the data TLB 104 comprising 64 TLBs, each having address translation information of VPN, V, SZ, SA, and TC.

The data TLB 104 has an information for address translation in each of TLBs 300 for translating a virtual address, which is received from the signal line 129 and used to access an external device, into a physical address. Data is written to the TLB 300 by inputting from the signal line 129 a signal in which a write position is designated from the CPU 101 and inputting write data through the signal line 136. The address translation information to be written is the same as that of the instruction TLB 102 as in FIG. 2.

Data is written to a built-in register 306 used in the case where the TLB is not used when setup data of the PCMCIA interface is inputted and written from the CPU 101 to the signal line 136.

When a request of accessing an external device is received from the CPU 101, it is compared with the 64 address translation information VPN corresponding to the virtual address sent through the signal line 129 all at once by a comparator 301. The range of the space of the address to be translated is mask processed and determination is carried out by the valid/invalid information V of the translation information. When it is found by the determination result that the address translation has failed, an exception signal is sent to the CPU. When it has succeeded, the address translation information PPN to be translated is read and a physical address is generated by an address generator 302.

When the cache memory is used, the physical address generated is selected by a selector 303. When the cache memory is not used, the address sent through the signal line 129 is selected by the selector 303.

Simultaneously, the timing control signal TC of the PCMCIA interface and the memory attribute selection signal SA are read. At this time, data sent through the signal line 129 is decoded by using an address decoder 304. In accordance with the decoded signal, whether the TLB is used or not is selected by using a selector 305. When the TLB 300 is not used, a value of the built-in register 306 in which the PCMCAIA control information is set is outputted to the external bus controller. When the TLB 300 is used, TC and SA in the TLB 300 are outputted to the external bus controller.

Figure 4:
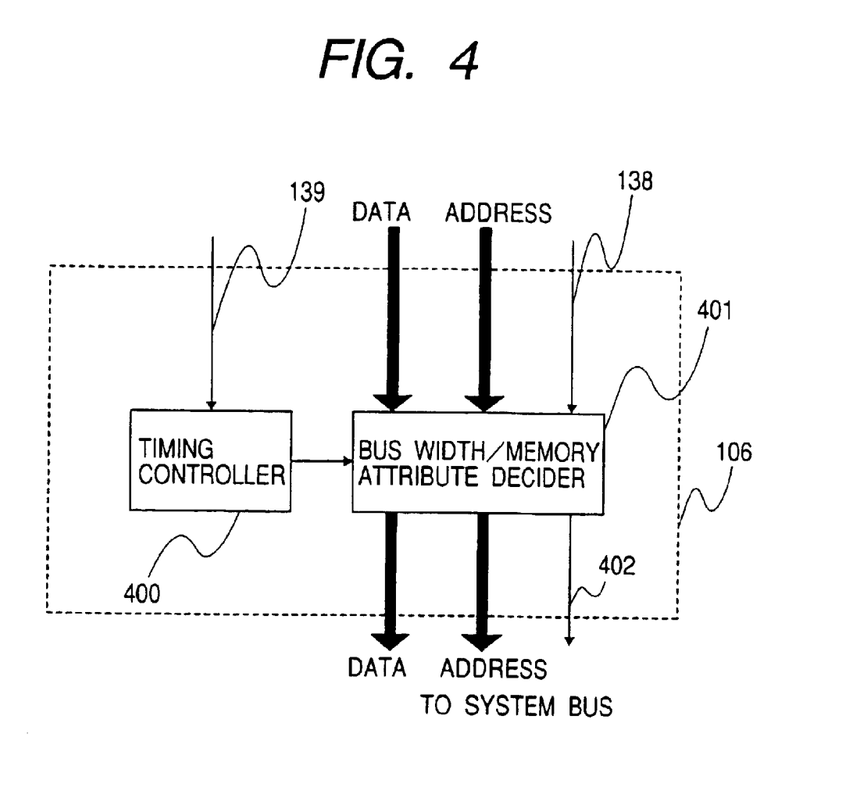
FIG. 4 shows an example diagram of the configuration of an external bus controller provided in the data processor for the embodiment of the invention.

FIG. 4 shows an example diagram of an internal configuration of the external bus controller 106. The diagram mainly shows the function portion for controlling the PCMCIA interface.

The external bus controller 106 selects the memory space and the bus width to be accessed by the PCMCIA interface based on a memory attribute selection signal sent via the memory attribute selection signal line 138. A concrete example of the memory attribute and the bus width controlled by the memory attribute signal 138 will be described hereinbelow. For example, assuming now that the memory attribute selection signal 138 is a 3-bit information, the information is allocated as follows. A 010 denotes an 8-bit I/O space, a 011 denotes a 16-bit I/O space, a 100 denotes an 8-bit unified memory space, a 101 denotes a 16-bit unified memory space, a 110 denotes an 8-bit memory attribute space, and a 111 denotes a 16-bit memory attribute space.

The timings of outputting the address, data, and control signals 402 such as a write enable signal to the PCMCIA interface are controlled by using a timing control signal sent through the signal line 139 and determining the wait width through a timing controller 400. For example, there is a method of controlling the timing by setting the wait value sent to a bus width/memory attribute decider 401 into a counter by the timing controller 400 and of not inputting/outputting data from/to the system bus until the counter becomes 0.

Figure 5:
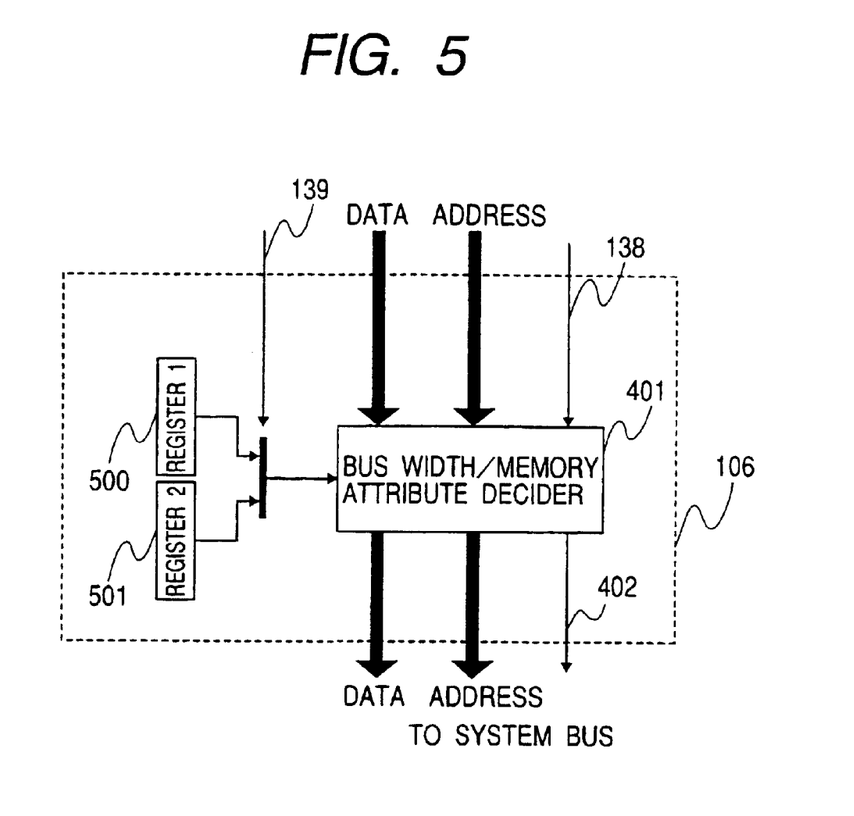
FIG. 5 shows an example diagram of the configuration of the external bus controller provided in the data processor for the embodiment of the invention.

FIG. 5 shows an example diagram of an internal configuration of an external bus controller 106 and illustrates a PCMCIA interface access function portion using built-in registers for timing control of the external bus controller.

Either a built-in register 1 (500) or a built-in register 2 (501) in the external bus controller 106 is selected by the timing control signal sent through the signal line 139 and a process is performed by the selected built-in register. Although only two built-in registers are shown here, the number of registers is not especially limited but is determined according to the bit width of the timing control signal from the signal line 139.

Figure 6:
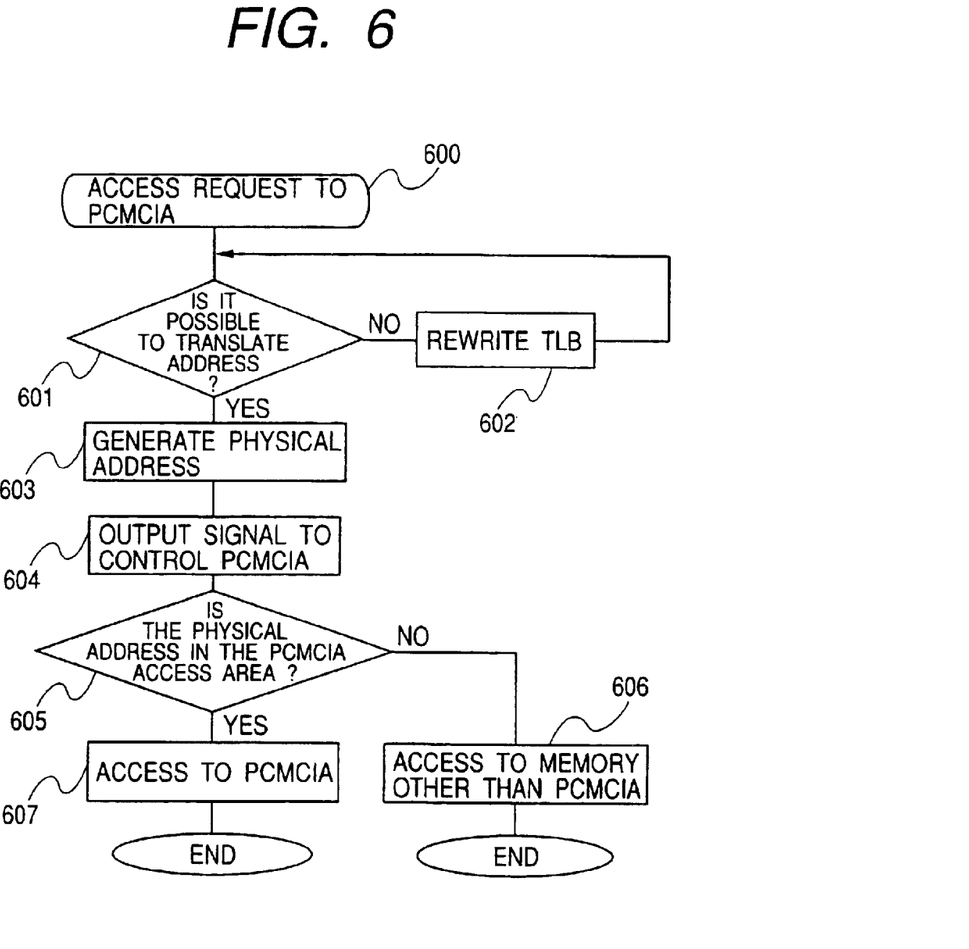
FIG. 6 shows a processing flow chart of accessing a PCMCIA interface. Numerals used in each figure are as follows.

FIG. 6 shows a processing flow chart of accessing the PCMCIA interface. The operation flow is described commonly to the PCMCIA interface access from the instruction TLB 102 and the PCMCIA interface access from the data TLB. In response to an access request to the PCMCIA interface (step 600), whether the address can be translated or not is determined (step 601). When the address translation information is not recorded, it is rewritten (step 602). Although it is rewritten by an exception processing routine on a software program, it may be automatically rewritten by the data processor. When the address can be translated, the address is translated into a physical address by using translation information (step 603) and, simultaneously, the PCMCIA interface control information is outputted (step 604). Whether the physical address is in the PCMCIA interface access area or not is determined by the external bus controller 106 (step 605). When the physical address is not in the PCMCIA interface access area, a memory other than the PCMCIA interface is accessed (step 606). When the physical address is in the PCMCIA interface access area, a method of accessing the PCMCIA interface is determined by using the control information of the PCMCIA interface (step 607).

Figure 7:
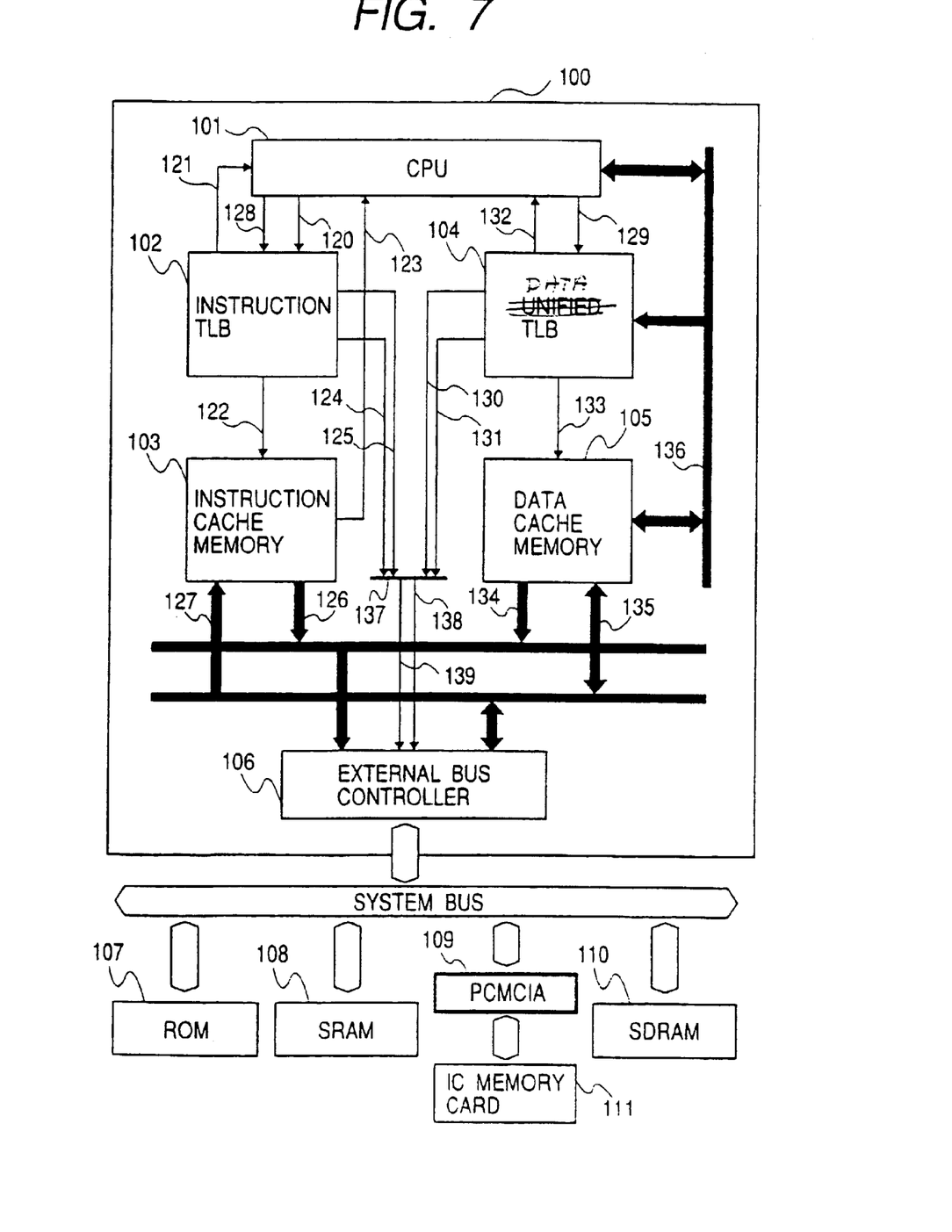

FIG. 7 shows a configuration diagram in which a specific device is connected with the PCMCIA interface illustrated n FIG. 1. Although an example block diagram of connecting an IC memory card 111 is shown in FIG. 7, the device connected with the PCMCIA interface is not limited to the embodiment. Other devices such as a modem can be also connected with.

The standard of the PCMCIA interface will now be described. In the PCMCIA interface, six space attributes exists. Concretely, they are an IOIS16 indicating a signal for switching between 8 bits and 16 bits during an operation, two I/O spaces of 8 bits and 16 bits used by a modem or the like, two memory spaces of 8 bits and 16 bits used by a memory card or the like, and a memory attribute space for reading the specification of a device connected with the PCMCIA interface. How to operate the spaces is specified by a program. An example embodiment of how to operate will be described hereinbelow. When accessing the PCMCIA interface, first, an access to the memory attribute space is performed to read an information such as what is connected with the interface, what is the specification of the device connected with, and which one of the I/O space or the memory space is used. Then an operation is started so as to use the designated space based on the read information. As described above, although the PCMCIA interface controls the device connected therewith, the method of controlling depends on the program.

What is claimed is:

1. A data processor comprising:
   a CPU for outputting a first address;
   address translation means for inputting said first address, translating said first address to a second address, and outputting said second address; and
   external bus control means for inputting said second address and outputting said second address to an external device,
   wherein said address translation means has an address translation buffer, a register, and selection means,
   said address translation buffer stores a first external device control information for controlling said external device in association with either said first address or said second address,
   said register has a second external device control information, and
   said selection means selects either said first external device control information or said second external device control information and outputs a selected information to said external bus control means.

2. A data processor according to claim 1, wherein said external device is a device having a PCMCIA interface, and
   each of said first external device control information and said second external device control information is an information which specifies at least one of an access timing, a memory attribute, or a bus width of said external device.

3. A data processor according to claim 1, wherein said first selection means outputs said second external device control information stored in said register to said external bus control means when said address translation buffer is not used.

4. A data processor according to claim 1, wherein said address translation means further comprises an address decoder for receiving said first address; and
   said first selection means selects either said first external device control information or said second external device control information based on a result of decoding of said address decoder and outputs a selected information to said external bus control means.

* * * * *